(12) United States Patent
Greer, IV

(10) Patent No.: US 7,393,881 B2
(45) Date of Patent: *Jul. 1, 2008

(54) COLORED RADIATION CURABLE COATING COMPOSITIONS FOR IDENTIFYING TELECOMMUNICATIONS ELEMENTS AND TELECOMMUNICATIONS ELEMENTS COATED THEREBY

(75) Inventor: Robert W. Greer, IV, Lexington, NC (US)

(73) Assignee: ALCATEL, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/312,581

(22) Filed: Dec. 21, 2005

(65) Prior Publication Data

US 2006/0105169 A1 May 18, 2006

Related U.S. Application Data

(60) Division of application No. 09/870,482, filed on Jun. 1, 2001, which is a continuation-in-part of application No. 09/360,951, filed on Jul. 27, 1999.

(51) Int. Cl.
  *C08F 2/48* (2006.01)
  *B32B 15/095* (2006.01)

(52) U.S. Cl. .............................. 522/96; 522/90; 522/97; 522/74; 522/75; 522/134; 522/135; 522/137; 522/141; 522/144; 522/146; 522/173; 522/174; 522/182; 522/904; 522/905; 528/65; 528/66; 528/45; 528/69; 523/160; 523/161; 428/378; 428/383; 106/31.27; 106/31.28; 106/31.6

(58) Field of Classification Search .................. 522/96, 522/90, 74, 75, 134, 135, 137, 141, 144, 522/146, 173, 174, 182, 904, 97, 905; 528/65, 528/66, 45, 68, 69; 523/160, 161; 524/590, 524/871; 106/31.27, 31.28, 31.6

See application file for complete search history.

(56) References Cited

U.S. PATENT DOCUMENTS

| | | | |
|---|---|---|---|
| 3,157,633 A | 11/1964 | Kuhn | |
| 3,978,096 A | 8/1976 | Eilingsfeld et al. | |
| 4,016,181 A | 4/1977 | Chang | |
| 4,105,680 A | 8/1978 | Chung | |
| 4,200,762 A | 4/1980 | Schmidle | |
| 4,472,021 A | 9/1984 | Ansel et al. | |
| 4,507,407 A * | 3/1985 | Kluger et al. | 521/113 |
| 4,629,285 A | 12/1986 | Carter et al. | |
| 4,666,953 A | 5/1987 | Klemarczyk et al. | |
| 4,846,846 A * | 7/1989 | Rekers et al. | 8/515 |
| 4,954,416 A | 9/1990 | Wright et al. | |
| 5,015,068 A | 5/1991 | Petisce | |
| 5,074,643 A | 12/1991 | Petisce | |
| 5,146,531 A | 9/1992 | Shustack | |
| 5,182,148 A | 1/1993 | Kapp et al. | |
| 5,231,135 A | 7/1993 | Machell et al. | |
| 5,259,060 A | 11/1993 | Edwards et al. | |
| 5,302,627 A | 4/1994 | Field et al. | |
| 5,639,846 A | 6/1997 | Shustack | |
| 5,664,041 A | 9/1997 | Szum | |
| 5,933,559 A | 8/1999 | Petisce | |
| 5,958,584 A | 9/1999 | Petisce | |
| 6,011,077 A | 1/2000 | Muller | |
| 6,630,242 B1 * | 10/2003 | Lin et al. | 428/378 |

FOREIGN PATENT DOCUMENTS

| | | |
|---|---|---|
| EP | 0 205 291 | 12/1986 |
| EP | 0 348 024 A2 | 12/1989 |
| EP | 0348024 * | 12/1989 |
| WO | WO01/09053 * | 2/2001 |
| WO | WO 01/09053 A1 | 2/2001 |

OTHER PUBLICATIONS

Encyclopedia of Chemical Technology, Third Edition, vol. 8 "Diuretics to Emulsions"; pp. 212 and 279.
Huei-Hsiung Wang, Iou-Shan Tzun. "Modified Polyurethane with a Covalent Bond of Dye Molecule" Journal of Applied Polymer Science, vol. 73, pp. 245-253, 1999.
G.V. Maksimova, et al. "Interaction of Epoxy-Containing Organosilicon Compounds with Anthraquinone Dyes", Polymer Science, Ser. B, vol. 37, Nos. 3-4, 1995, pp. 143-145.
Gexing Shen, et al., "UV-Curable, Special Coding Inks for Optical Fibers", Journal of Coatings Technology, vol. 17, No. 894, Jul. 1999, pp. 69-72.
World Office Abstract, WO 9425665; "Radiation-Induced Fixation of Dyes" Nov. 10, 1994.

* cited by examiner

Primary Examiner—Sanza L. Mcclendon
(74) Attorney, Agent, or Firm—Sughrue Mion, PLLC

(57) ABSTRACT

A telecommunication element having a durable color identifying polymeric coating thereon is disclosed. The telecommunication element comprises an elongated communication transmission medium, such as an optical fiber or an optical fiber ribbon, and a radiation cured polymeric coating having an identifying color applied on at least a portion of the transmission medium. The identifying color in the polymeric coating is provided by chromophore molecules that are covalently bonded thereto. Coating compositions and a method are also disclosed.

4 Claims, 1 Drawing Sheet

COLORED RADIATION CURABLE COATING COMPOSITIONS FOR IDENTIFYING TELECOMMUNICATIONS ELEMENTS AND TELECOMMUNICATIONS ELEMENTS COATED THEREBY

CROSS-REFERENCE TO RELATED APPLICATION

This is a divisional of application Ser. No. 09/870,482, filed Jun. 1, 2001, which is a continuation-in-part of application Ser. No. 09/360,951, filed Jul. 27, 1999, the entire disclosures of which are expressly incorporated herein by reference.

BACKGROUND OF THE INVENTION

1. Field of the Invention

The present invention relates to radiation curable coatings for telecommunications elements such as optical fibers and optical fiber ribbons. More particularly, the present invention relates to colored radiation curable coating compositions for producing cured coatings on a telecommunications element, the coating compositions having an identifying color provided by dye molecules which are covalently bonded to the cured coating.

2. Description of Related Art

For many years now, optical fibers have been used as a reliable transmission medium in telecommunications cables. Typically, an optical fiber comprises a core, a cladding and one or more coatings applied over the cladding.

One purpose of the coatings is to protect the surface of the optical fiber from mechanical scratches and abrasions typically caused by subsequent handling and use. Another purpose of the coatings is to protect the glass from exposure to moisture. The coating or coatings may also have some influence over the fiber's optical characteristics because the coatings are physically responsive to external mechanical forces and temperature. The coating compositions applied to the optical fiber are typically liquid, radiation curable compositions. Typically, the coating compositions are cured on the optical fiber by exposing the coating composition to ultraviolet radiation, electron beam radiation or ionizing radiation for a predetermined period of time deemed suitable for effective curing. Telecommunications cables containing optical fibers come in a variety of configurations. In some cables, the optical fibers are held loosely inside a buffer tube. In other cables, the optical fibers are arranged in a planar array to form an optical fiber ribbon. The planar array is typically encapsulated by one or more radiation curable matrix material layers. The radiation curable matrix layers are cured by exposing the matrix material to ultraviolet radiation, electron beam radiation, ionizing radiation or infrared radiation for a predetermined period of time deemed suitable for effective curing.

In a telecommunications cable containing multiple optical fibers, the optical fibers may be distinguished from each other by the use of a color coating layer which has been applied over a coated optical fiber. Colors in the color coating layer are usually obtained by dispersing colored pigment particles in a suitable liquid carrier and applying the liquid carrier over the coating. Unfortunately, the use of pigment particles to provide color in color coatings for optical fibers has presented manufacturing and performance problems. For example, the pigment particles and the liquid carrier tend to gradually separate into two distinct phases.

As a result, pigmented color coatings have a relatively short shelf life. In addition, the phase separation in a pigmented coloring system is further complicated by the concurrent agglomeration of pigment particles. Undesirably, the presence of pigment particle agglomerates in a color coating on a coated optical fiber can induce micro-bending which results in transmission losses. Typically, a relatively high concentration of pigment material is required to achieve an opaque ultraviolet radiation curable color coating. Unfortunately, the required high concentration inhibits the transmission of incident ultraviolet radiation which is necessary to cure the color coating material because the pigments refract, reflect and scatter the incident radiation. The inhibition of the ultraviolet radiation results in a reduction in processing speed of the optical fiber along a manufacturing line and thereby increases production costs. Also, the slow cure speed of pigmented color coatings causes the processing and the cure of these materials to be sensitive to minor changes in the thickness of the color coatings.

The use of dyes to provide color in color coatings has been considered as an alternative to pigment-based color coatings. Dyes have the advantage over pigments of faster curing because the dyes do not scatter the curing radiation, although some dyes may absorb light which could slow curing. Dyes, however, are generally not preferred because they diffuse (bleed) out into common cable filling compounds resulting in a color loss. In an effort to reduce the bleeding, U.S. Pat. No. 5,074,643 teaches the use of a polymeric dye in a color coating. The polymeric dyes are macromolecular chromophore containing molecules that become entrapped in the cross linked coating network. While the entrapment results in a slowing of the bleeding process, the dyes nevertheless still bleed. Over time, even with the entrapped polymeric dyes, the color imparted to the fibers is likely to be lost and if the color is lost from the fibers, then identification of each of the fibers becomes extremely difficult and time consuming in the field during fiber splicing.

The color imparted to the fibers will be lost over time if the dyes themselves lack stability. In particular, the dyes should have sufficient thermal stability and light fastness to impart the desired color for an extended period of time.

If a telecommunications cable has many optical fiber ribbons, it is generally desirable to distinguish one optical fiber ribbon from another by coloring each of the optical fiber ribbons. Typically, color in a colored optical fiber ribbons is obtained in the same way as color is obtained in a color coated optical fiber. Either the optical fiber ribbon matrix composition is provided with pigments or a polymer dye is used. The same problems mentioned above with respect to colored optical fibers apply to colored optical fiber ribbons.

It is desirable to provide a durable color coating for a telecommunication element, such as an optical fiber, that can withstand the conditions in a typical operational environment that such elements are typically found. The present invention provides such a durable coating.

SUMMARY OF THE INVENTION

It is an object of the present invention to provide a colored, radiation curable composition for providing a durable color identifying coating on a transmission medium of a telecommunication element such as an optical fiber.

It is another object of the present invention to provide a telecommunication element which has a color identifying coating whose color does not bleed in the presence of typical cable filling compounds.

It is yet another object of the present invention to provide an optical fiber ribbon having a colored matrix whose color does not bleed in the presence of typical cable filling compounds.

It is one aspect of the present invention to meet the foregoing objectives by providing a telecommunication element having a color identifying coating thereon. The telecommunication element comprises at least one elongated communication transmission medium, and a radiation cured polymeric coating having an identifying color applied on at least a portion of the transmission medium, wherein the identifying color in the polymeric coating is provided by chromophore molecules covalently bonded thereto.

The polymeric coating may comprise a radiation cured, crosslinked polymeric network of molecules. The chromophore molecules may be covalently bonded to this polymeric network by one or more covalent bonds. In one embodiment, the chromophore molecules are covalently bonded to a radiation curable oligomeric backbone, wherein each chromophore molecule is attached to the remainder of the oligomer by two or more covalent bonds. The oligomer itself includes radiation curable groups which become covalently bonded to other constituents of the polymeric coating matrix during the curing step.

In another embodiment, the chromophore molecule includes, as one or more substituents, one or more radiation curable groups. This chromophore with one or more radiation curable groups becomes covalently bonded by one or more covalent bonds to other constituents of the polymeric matrix during the curing step.

It is another aspect of the present invention to meet the foregoing objectives by providing a colored, radiation curable coating composition for a telecommunication element, the coating composition being a color identifying polymeric coating having chromophore molecules covalently bonded thereto. The coating composition may comprise a radiation curable composition capable of forming a polymeric coating and a colored oligomer having chromophore molecules covalently bonded thereto, wherein the colored oligomer is capable of covalent bonding with the radiation curable composition.

It is yet another aspect of the present invention to meet the foregoing objectives by providing a method for producing a color identifying polymeric coating having chromophore molecules covalently bonded thereto on at least a portion of a transmission medium of a telecommunication element. The method may comprise the steps of: providing a transmission medium; providing a colored, radiation curable coating composition comprising a radiation curable composition capable of forming a polymeric coating and a colored oligomer having chromophore molecules covalently bonded thereto, wherein the colored oligomer is capable of covalent bonding with the radiation curable composition; applying the coating composition to at least a portion of the transmission medium; and exposing the applied coating composition for a suitable period of time to radiation of a suitable wavelength and intensity to cause curing of the coating composition into the color identifying polymeric coating.

The invention will be more fully understood when reference is made to the following detailed description taken in conjunction with the accompanying drawings.

BRIEF DESCRIPTION OF THE DRAWINGS

The drawings, not drawn to scale, include.

DETAILED DESCRIPTION OF THE PRESENT INVENTION

Color Coated Optical Fibers

Figure 1A:
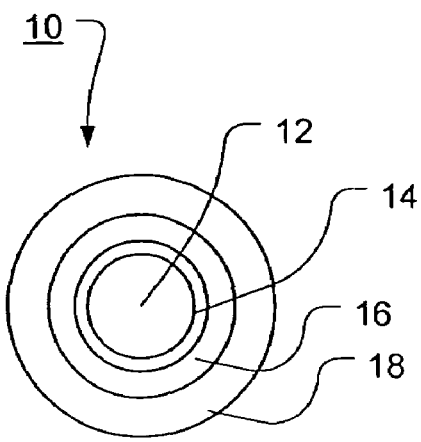
FIG. 1A, which is a cross-sectional view of an optical fiber coated with primary and secondary coatings.

Typical telecommunications elements include an elongated transmission medium such as a metallic wire or an optical fiber. Referring to FIG. 1A, a typical optical fiber 10 transmission medium is shown. The typical optical fiber 10 is formed by a glass core 12 which is surrounded by a glass cladding 14. The glass cladding 14 of the optical fiber 10 is usually surrounded by one or more protective polymeric coatings.

For example, as shown in FIG. 1A, an inner protective polymeric coating 16 covers at least a portion of the cladding 14 and an outer protective polymeric coating 18 typically covers at least a portion of the inner coating 16. The inner 16 and outer 18 protective coatings may also be referred to as inner primary and outer primary coatings or primary and secondary coatings. The inner coating 16 is usually obtained by applying a radiation curable (polymerizable) composition capable of forming a polymeric coating upon curing over the cladding 14.

The radiation curable composition is normally applied by passing the optical fiber through a first die or a coating applicator using techniques well known in the art, and therefore, not described herein. Once the radiation curable composition is applied over the cladding 14, the composition may be cured by exposing it to radiation, such as ultraviolet radiation, electron beam radiation or ionizing radiation, to initiate curing (polymerization) thereof Ultraviolet radiation is most commonly used.

The application and curing of the radiation curable composition to form the inner coating 16 may be followed by the application and curing of another radiation curable composition capable of forming a polymeric coating which forms the outer coating 18. This sequence is known as a wet-on-dry application of the outer coating 18. Alternatively, the application of the radiation curable composition which forms the inner coating 16 may be directly followed by the application of a radiation curable composition forming the outer coating 18 prior to exposure to the curing radiation. This is known in the art as a wet-on-wet application. Each application technique is well known in the art.

A typical radiation curable composition capable of forming a polymeric coating for the inner 16 and outer 18 coatings usually includes an acrylated urethane oligomer, which is a reaction product of (1) a polyol, such as a polyether diol, polyester diol or hydrocarbon diol; (2) a polyisocyanate, such as an aliphatic diisocyanate; and (3) an endcapping monomer, such as a hydroxyalkylacrylate or a hydroxyalkylmethacrylate. These oligomers typically have monofunctionality, difunctionality or trifunctionality. Other materials, such as photoinitiators, reactive diluents and adhesion promotors, such as organofunctional silane adhesion promoters, may be included in the radiation curable composition to tailor the physical properties of the coating to meet specific end-use application requirements, such as to provide good thermal, oxidative and hydrolytic stability as well as a soft, compliant, low glass transition temperature-type coating. A discussion of radiation curable primary and secondary coating compositions may be found in U.S. Pat. No. 5,146,531, which is incorporated in its entirety herein by reference.

According to the present invention, the uncolored radiation curable composition that is applied over the cladding and cured to form the inner coating 16 may be colored, if desired, by adding to the composition colored radiation curable monomers or oligomers containing chromophore molecules that are covalently bonded thereto. Typical chromophore molecules include anthraquinone, methione, and azo compounds which can provide the three primary colors (blue, yellow and red). For the purposes of providing a high degree of thermal stability and light fastness, however, it is preferred that the chromophore molecule not be an azo compound. It has been discovered that azo dyes frequently fade when slightly heated or exposed to light. In addition, azo dyes can react at room temperature and cause a coating material to gel.

The chromophore molecules may be covalently bonded to radiation curable oligomers by reacting functional or reactive dyes having the chromophore molecules covalently bonded thereto with the uncolored radiation curable composition. The colored radiation curable oligomers generally have end groups or side groups that make them radiation curable and capable of covalent bonding with other oligomers. When exposed to radiation, these groups covalently bond with other similar groups in the radiation curable composition. For example, the radiation curable composition may have acrylate groups, vinyl groups or epoxy groups.

The dye may be functionalized with any end group that may be reacted to covalently bond with another molecule or series of molecules in the radiation curable composition that eventually incorporate the above mentioned radiation curable end group or side group. For example, the reactive dye may be a polyol having hydroxy functionality containing a covalently bonded chromophore molecule, or the reactive dye may have ester or carboxy functionality in addition to the hydroxy functionality described above. Thus, by reacting the reactive or functional dye containing chromophore molecules covalently bonded thereto with oligomers present in the radiation curable composition, the chromophores become incorporated not only into the backbone of the radiation curable oligomer by way of covalent bonds, but ultimately into the cured coating as well.

As a general example for forming a colored oligomer for providing a radiation cured polymeric colored coating capable of identifying a telecommunications element, a polyol reactive dye having a chromophore molecule covalently bonded thereto and containing hydroxy end groups is provided, in addition to, or in place of, some or all of the typical polyol, e.g. hydrocarbon diol, that is reacted with a polyisocyanate, e.g. aliphatic diisocyanate, and end-capping monomers to form a typical acrylated urethane oligomer reaction product used in an radiation curable composition for coating optical fibers. Suitable polyol reactive dyes are marketed under the trademark REACTINT™ by the Milliken Chemical Company. Those skilled in the art will now recognize that if a sufficient amount of a polyol reactive dye is reacted with polyisocyanate, then the resulting acrylated urethane oligomer reaction product will be colored in accordance with the color of the chromophore molecules that are covalently bonded to the oligomer.

Figure 1B:
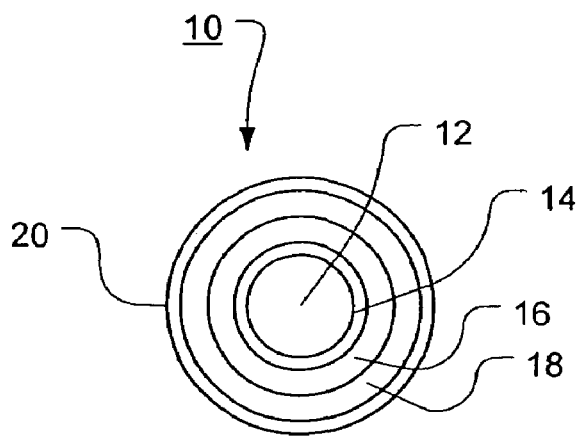
FIG. 1B, which is a cross-sectional view of an optical fiber coated with primary, secondary and tertiary coatings.

The colored, acrylated urethane oligomer may be applied directly to the cladding of the optical fiber as a colored radiation curable composition to form the inner coating 16 or it may be applied directly over a previously applied inner coating as the outer coating 18. Those skilled in the art will recognize that the colored oligomer may also be applied over a previously applied outer coating as a tertiary coating 20, which is illustrated in FIG. 1B. In a commercially advantageous alternative, the colored oligomer may be blended or diluted with a commercially available radiation curable composition typically formulated to provide a protective coating on the optical fiber, so that the combination of the colored oligomer and the commercially available composition form a colored radiation curable composition which is applied over the cladding 14, the inner coating 16 or the outer coating 18 of the optical fiber. Such radiation curable compositions may include one or more uncolored urethane acrylate oligomers, a reactive diluent, one or more photoinitiators and organofunctional silane adhesion promoters. In other words, the colored radiation curable oligomer described herein may be added, in a quantity sufficient to impart color, to a commercially known, standard, uncolored, radiation curable composition used to provide a protective coating over an optical fiber.

After the radiation curable composition containing the colored oligomer is cured, i.e. polymerized, by exposure to radiation of a suitable wavelength and intensity for a suitable period of time, the resulting polymeric coating applied on the cladding 14, the inner coating 16 or the outer coating 18 of the optical fiber 10, contains chromophore molecules which are covalently bonded thereto. Because the chromophore molecules are covalently bonded to the polymeric coating, the risk of color loss due to bleeding is negligible. Thus, the manufacturing advantages that a dye provides over pigments, e.g. application and cure speed, can be obtained while avoiding the bleeding disadvantages that a dye which is not covalently bonded to the polymeric coating may have when used in an optical fiber environment.

According to one embodiment described herein, a colored oligomer is provided which is particularly suited for imparting color to a communications element, such as a coated optical fiber. This colored oligomer may be formed by first forming an oligomer precursor having at least two terminal isocyanate groups. This oligomer precursor may be said to be end capped with isocyanate groups.

The isocyanate end capped oligomer may be converted into an oligomer end capped with radiation curable groups. For example, the isocyanate end capped oligomer precursor may be reacted with a radiation curable monomer including both (i) a reactive functionality which is reactive with the isocyanate groups of the oligomer precursor and (ii) a radiation curable functionality, including ethylenic unsaturation. Groups which are reactive with isocyanate groups include —OH, —NH$_2$ and —SH. The reaction with the isocyanate groups generates covalent linkages. In particular, the reaction of an —OH group with an isocyanate group creates a urethane linkage, and the reaction of an —NH$_2$ group with an isocyanate group creates a urea linkage.

The oligomer precursor is prepared by reacting at least one polyisocyanate, such as a diisocyanate, with at least one polyfunctional compound having at least two isocyanate reactive groups, such as —OH, —NH$_2$ and —SH. A particular such polyfunctional compound is a diol.

At least a portion of the polyfunctional compound, e.g. diol, includes a chromophore, such as an anthraquinone chromophore. Particular examples of anthraquinone chromophores are given an article entitled "Dyes, Anthraquinone" at pages 212-279 of the *Kirk-Othmer Encyclopedia of Chemical Technology*, Third Edition, Volume 8, 1979.

A particular example of a polyfunctional compound including a chromophore is an anthraquinone dye having the following formula:

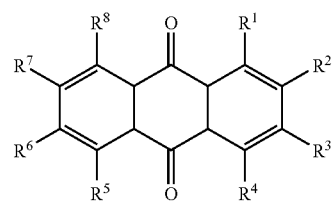

wherein the R groups $R^1$, $R^2$, $R^3$, $R^4$, $R^5$, $R^6$, $R^7$ and $R^8$, are each independently selected from the group consisting of hydrogen, amino, hydroxy, halogen, nitro, carboxylated alkali metal, sulfated alkali metal and a hydrocarbyl group optionally containing one or more heteroatoms, provided that at least two of groups $R^1$ through $R^8$ have at least one isocyanate reactive functionality selected from the group consisting of —OH, —NH$_2$ and —SH, and further wherein adjacent R groups from amongst R groups $R^1$ through $R^8$ may form a ring.

An example of a compound wherein adjacent R groups from amongst R groups $R^1$ through $R^8$ form a ring is a compound wherein $R^1$ and $R^2$ combine to form a benzene ring.

When an R group from amongst R groups $R^1$ through $R^8$ is a hydrocarbyl group including a heteroatom, the heteroatom may appear anywhere in the group, for example, the heteroatom may appear (1) as a linking group attached directly to the anthraquinone core, (2) as a side group, or (3) as a linking group linking two or more hydrocarbyl groups together.

For example, from 1 to 3 of R groups $R^1$ through $R^8$ may have the following formula:

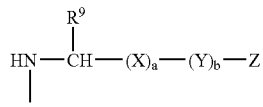

wherein $R^9$ is hydrogen or an alkyl group having from 1 to about 12 carbon atoms, X is —$CH_2$—, a is an integer of from 1 to about 6, Y represents polymeric units of hydroxy alkylenes or alkylene oxide monomers selected from the group consisting of ethylene oxide, propylene oxide, butylene oxide, cyclohexane oxide, and glycidol, b is either 0 or 1, and Z is a reactive —OH, —$NH_2$, or —SH group.

Specific examples of such anthraquinone dyes are described in U.S. Pat. No. 4,846,846 and may have the following formula:

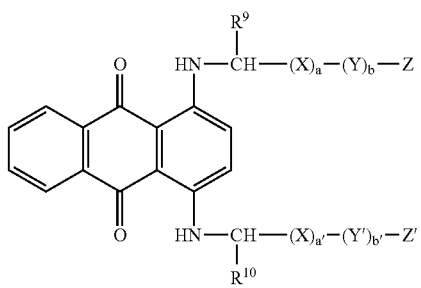

wherein $R^9$ and $R^{10}$ are independently selected from hydrogen or an alkyl group having from 1 to about 12 carbon atoms, X is —$CH_2$—, a and a' are independently selected from integers of from 1 to about 6, Y and Y' are independently selected from polymeric units of hydroxy alkylenes or alkylene oxide monomers selected from the group consisting of ethylene oxide, propylene oxide, butylene oxide, cyclohexane oxide, and glycidol, b and b' are independently either 0 or 1, and Z and Z' are independently selected from reactive —OH, —$NH_2$, or —SH groups.

As described in U.S. Pat. No. 4,846,846, a particular subclass of such anthraquinone dyes may have the following formula:

wherein n, n', m, m', p, and p' may independently have a value of from 0 to about 40.

A particular example of an anthraquinone dye described in U.S. Pat. No. 4,846,846 has the following formula:

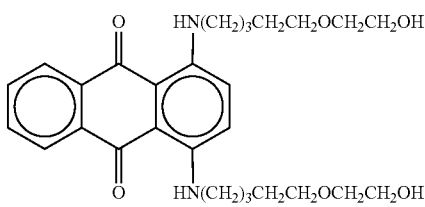

Other examples of anthraquinone dyes include 1,5-bis((3-hydroxy-2,2-dimethylpropyl)amino)-9,10-anthracenedione, which is a red dye; 2,2'-((9,10-dihydro-9,10-dioxo-1,5-anthracenediyl)bis(thio))bis-benzoic acid, 2-hydroxyethyl ester, which is a yellow dye; and 1,5-bis((2,2-dimethyl-3-hydroxypropyl)amino)-4,8-bis((4-methylphenyl)thio)anthraquinone, which is a blue dye. Other colors, such as pink, green, black, brown and violet, may be formed by blending these dyes or by blending oligomers containing the same.

In addition to the above-mentioned colored oligomers having chromophoric species incorporated into the backbone structure thereof, other types of reactive chromophoric species may be used to covalently link chromophores to the polymeric matrix of coatings. For example, another type of reactive chromophoric species may be a reactive anthraquinone dye comprising an anthraquinone core group with at least one substituent comprising a radiation curable group. The radiation curable group may be an ethylenically unsaturated group, such as a (meth)acrylic group, or an epoxy group.

A reactive anthraquinone dye comprising an anthraquinone core group with at least one substituent comprising a radiation curable group may have the following formula:

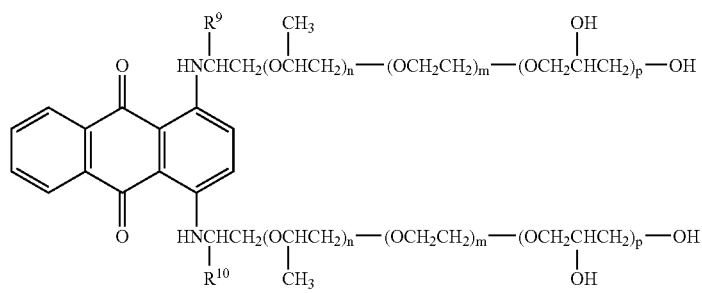

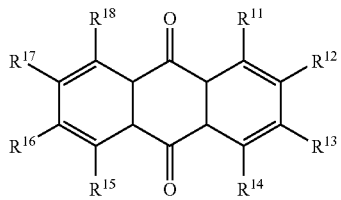

wherein the R groups $R^{11}$, $R^{12}$, $R^{13}$, $R^{14}$, $R^{15}$, $R^{16}$, $R^{17}$ and $R^{18}$ are each independently selected from the group consisting of hydrogen, amino, hydroxy, halogen, nitro, carboxylated alkali metal, sulfated alkali metal and a hydrocarbyl group optionally containing one or more heteroatoms, provided that at least one of groups $R^{11}$ through $R^{18}$ have at least one ethylenically unsaturated radiation curable functionality.

For example, one or two of R groups $R^{11}$ through $R^{18}$ may have a (meth)acrylic functionality and at least four of R groups $R^{11}$ through $R^{18}$ may be hydrogen.

Reactive anthraquinone dyes comprising an anthraquinone core group with at least one substituent comprising a radiation curable group may be formed by esterification reactions of hydroxy functional anthraquinone dyes with acrylic acid type monomers. For example, the above-mentioned dihydroxy functional anthraquinone dyes, i.e. 1,5-bis((3-hydroxy-2,2-dimethylpropyl)amino)-9,10-anthracenedione, 2,2'-((9,10-dihydro-9,10-dioxo-1,5-anthracenediyl)bis(thio))bis-benzoic acid, 2-hydroxyethyl ester, and 1,5-bis((2,2-dimethyl-3-hydroxypropyl)amino)-4,8-bis((4-methylphenyl)thio)anthraquinone, could undergo such esterification reactions to form the following compounds, respectively:

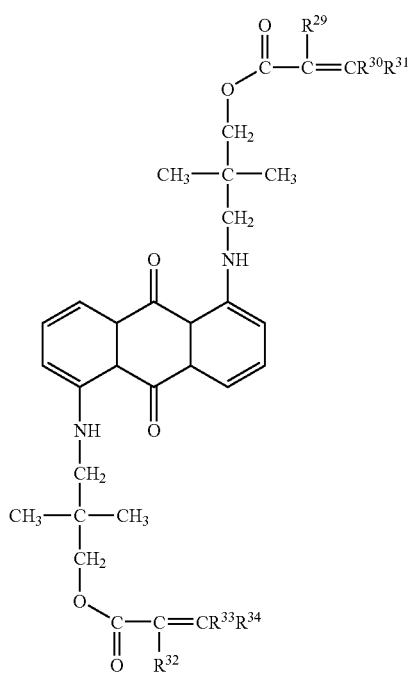

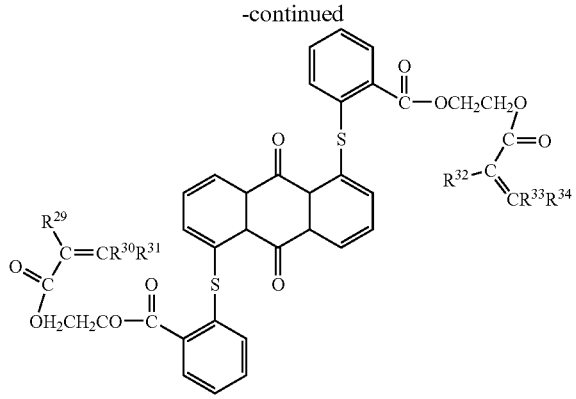

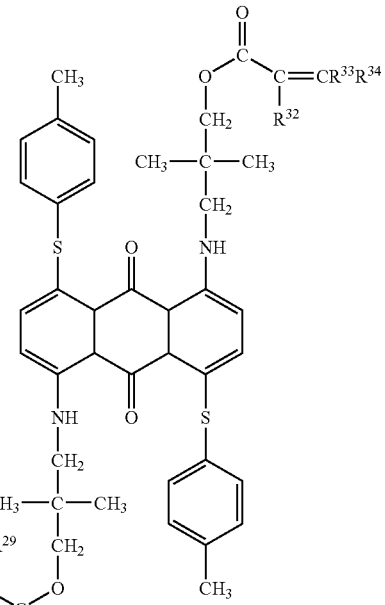

wherein $R^{29}$, $R^{30}$, $R^{31}$, $R^{32}$, $R^{33}$, and $R^{34}$ are the same or different and are independently hydrogen or a $C_1$ to $C_6$ alkyl optionally substituted with one or more substituents selected from the group consisting of —OH, —NH$_2$, —SH, —NO$_2$, —CN and halogen.

The radiation curable chromophoric compound, whether in the form of a monomer or an oligomer, may be mixed with standard components of a radiation curable resin for coating a communications element, such as an optical fiber. Such components may include (1) at least one (meth)acrylate end capped urethane oligomer, (2) at least one photoinitiator, and (3) at least one reactive diluent.

The (meth)acrylate end capped urethane oligomer may be synthesized by methods known in the art or purchased commercially.

Polyether-based, aliphatic urethane acrylate compounds are available from UCB Chemical Corp. They are sold under the name EBECRYL, and include EBECRYL 230. EBE- CRYL 230 is a difunctional aliphatic urethane acrylate oligomer with a polyether backbone.

Polyester-based, aliphatic urethane acrylate oligomers are available from Sartomer. They are sold under the name CN966xxx, and include CN966J75, a difunctional aliphatic urethane acrylate oligomer with a polyester backbone. These oligomers are also available from Henkel Corp., which manufactures PHOTOMER products, including PHOTOMER 6010. A polyester polyol, which can be used to make a polyester-based urethane acrylate oligomer, is DESMOPHEN 2001KS, available from Bayer Corp. This product is an ethylene butylene adipate diol.

A urethane acrylate oligomer may be formed by reacting a polyol, for example a diol, with a multifunctional isocyanate, for example a diisocyanate, and then end-capping with a hydroxy-functional (meth)acrylate.

The polyol may be a polyol with a number average molecular weight of about 200-10,000, such as polyether polyol, polyester polyol, polycarbonate polyol, and hydrocarbon polyol.

Polyether polyols may be homopolymers or copolymers of alkylene oxides including $C_2$ to $C_5$ alkylene oxides such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ polyols, such as 12-hydroxystearyl alcohol and hydrogenated dimerdiol; and adducts of the above alkylene oxides with bisphenol-A or hydrogenated bisphenol-A. These polyether polyols may be used alone or in combination of two or more.

Polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid.

Polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl)cyclohexane. The short chain dialkylcarbonate may be $C_1$-$C_4$ alkylcarbonates such as, for example, dimethylcarbonate and diethylcarbonate.

Polyols with a low molecular weight may be used. Examples of polyols with a low molecular weight include ethylene glycol, propylene glycol, tripropylene glycol, 1,3- or 1,4-butanediol, neopentyl glycol, 1,6-hexanediol, 1,9-nonanediol, 1,10-decanediol, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol, chimyl alcohol, batyl alcohol, selachyl alcohol, and dimeric acid diol.

Any of the above-mentioned polyols, which may be used to prepare (meth)acrylate end capped oligomers, may be blended with polyols including chromophoric groups and reacted with polyisocyanates to form colored oligomers.

A multi-functional isocyanate, used to form colored or uncolored oligomers, may be, for example, an aromatic polyisocyanate, an aromatic aliphatic polyisocyanate, an alicyclic polyisocyanate, or an aliphatic polyisocyanate.

Examples of the aromatic polyisocyanates include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and polyisocyanates such as triphenylmethane-4,4',4"-triisocyanate, 1,3,5-triisocyanatebenzene, 2,4,6-triisocyanatetoluene, and 4,4'-diphenylmethane-2,2', 5,5'-tetraisocyanate.

Examples of the aromatic aliphatic polyisocyanates include diisocyanates such as 1,3- or 1,4-xylene diisocyanate or mixtures thereof and 1,3- or 1,4-bis(1-isocyanate-1-methylethyl)benzene or mixtures thereof, and polyisocyanates such as 1,3,5-triisocyanatermethylbenzene.

Examples of the alicyclic polyisocyanates include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate or IPDI), 4,4'-methylenebis(cyclohexyl isocyanate) ($H_{12}$MDI or DESMODUR W, available from Bayer), methyl-2,4-cyclohexane diisocyanate, methyl-2,6-cyclohexane diisocyanate, and 1,3- or 1,4-bis (isocyanatemethyl)cyclohexane; and polyisocyanates such as 1,3,5-triisocyanatecyclohexane, 1,3,5-trimethylisocyanatecyclohexane, 2-(3-isocyanatepropyl)-2,5-di(isocyanatemethyl)-bicyclo(2.2.1) heptane, 2-(3-isocyanatepropyl)-2,6-di(isocyanatemethyl)-bicyclo(2.2.1)heptane, 3-(3-isocyanatepropyl)-2,5-di (isocyanatemethyl)-bicyclo(2.2.1)heptane, 5-(2-isocyanateethyl)-2-isocyanatemethyl-3-(3-isocyanatepropyl)-bicyclo(2.2.1)heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, and 6-(2-isocyanateethyl)-2-isocyanatemethyl-2-(3-isocyanatepropyl)-bicyclo(2.2.1)heptane.

Examples of the aliphatic polyisocyanates include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate; and polyisocyanates such as lysine ester triisocyanate, 1,4,8-triisocyanateoctane, 1,6,11-triisocyanateundecane, 1,8-diisocyanate-4-isocyanatemethtloctane, 1,3,6-triisocyanatehexane, and 2,5,7-trimethyl-1,8-isocyanate-5-isocyanatemethyloctane.

Moreover, derivatives from the above polyisocyanates can be used. Examples of the derivatives include a dimer, a trimer, biuret, allophanate, carbodiimide, polymethylenepolyphenyl polyisocyanate (referred to as crude MDI or polymeric MDI), crude TDI, and an adduct of an isocyanate compound and a polyol with a low molecular weight.

"(Meth)acrylate" means acrylate, methacrylate, or a mixture thereof.

The reaction product of polyol and polyisocyanate may be reacted with one or more hydroxy-functional (meth)acrylates. Examples of the hydroxy-functional (meth)acrylates include 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2-hydroxy-3-phenyloxypropyl (meth)acrylate, 2-hydroxyalkyl (meth)acryloyl phosphate, 4-hydroxycyclohexyl (meth) acrylate, cyclohexanedimethanol mono(meth)acrylate, neopentyl glycol mono(meth)acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl (meth)acrylate. The above hydroxyl group-containing (meth)acrylates may be used alone or in combination of two or more.

The molecular weight range of the radiation curable oligomer may vary from 5000 to 25,000 MW based upon the specific requirements for properties of the primary or secondary coating in accordance with the present invention.

Any suitable free radical photoinitiator may be included in the coating composition. Suitable free radical-type photoinitiators include, for example, an acyl phosphine oxide photoinitiator, more specifically, a benzoyl diaryl phosphine oxide photoinitiator. An example of suitable benzoyl diaryl phosphine oxide photoinitiators include: 2,4,6-trimethylbenzoyl-diphenyl-phosphine oxide (LUCERIN TPO available from BASF). Further examples of free radical-type photoinitiators include: hydroxycyclohexylphenylketone; hydroxymethylphenylpropanone; dimethoxyphenylacetophenone; 2-methyl-1-[4-(methyl thio)-phenyl]-2-morpholinopropanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone; diethoxyphenyl acetophenone; 2,4,6-trimethylbenzoyl diphenylphosphone; a mixture of (2,6-dimethoxy benzoyl)-2,4,4-trimethylpentylphosphineoxide and 2-hydroxy-2-methyl-1-phenyl-propane-1-one; and mixtures of the foregoing. Many of these are sold under the names IRGACURE® and DAROCUR® and are available from Ciba Additives.

The free radical photoinitiator may be a mixture of phosphine oxide photoinitiators, an example of which is DAROCUR 4265 available from Ciba Additives. This particular photoiniator is a 50:50 weight percent mixture of diphenyl-2,4,6-trimethyl benzoly phosphine oxide and 2-hydroxy-2-methyl-1-phenylpropan-1-one. Another is IRGACURE 1700 (also from Ciba Additives), a blend of bis (2,6-dimethoxybenzoyl)-2,4,4-trimethylpentylphosphine oxide and 2-hydroxy-2-methyl-1-phenyl-propane-1-one.

The free radical-type photoinitiator may be used in an amount of 10% or less by weight, for example, about 0.25 to about 6% by weight, e.g., about 4% by weight based upon the total weight of the composition.

Adequate curing of the coating compositions of the present invention is promoted by the presence of the reactive diluent(s). The reactive diluent also functions as a solvent for the urethane acrylate oligomer. The use of the reactive diluent(s) allows the formulator to adjust the viscosity of the solution to improve processability. In other words, the reactive diluent prevents the viscosity of the oligomer composition from becoming too viscous or inflexible for suitable primary or secondary optical fiber coating use.

The mono- or difunctional reactive diluent(s) may, for example, be a lower molecular weight, liquid (meth)acrylate-functional compound including the following di(meth)acrylates and monofunctional (meth)acrylates: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly (butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, and ethoxylated bisphenol-A diacrylate. Another example of a reactive diluent is N-vinyl caprolactam. Further examples are the commercially available products from Sartomer, SR 489, a tridecyl acrylate and SR 506, an isobornyl acrylate.

The present radiation curable coating compositions may be free of non-reactive diluents, such as water or organic solvents, which lack ethylenic unsaturation.

The primary coating composition may include an adhesion promoter. Examples of adhesion promoters include acid functional materials and organofunctional silanes. For example, the organofunctional silane may be an amino-functional silane, an acrylamido-functional silane, a mercapto-functional silane, an allyl-functional silane, a vinyl-functional silane, a methylacrylate-functional silane, and an acrylate-functional silane. The organofunctional silane may be mercaptoalkyl trialkoxyl silane, a methacryloyxlalkyl trialkoxy silane, an aminoalkyl trialkoxyl silane, a vinyl trialikoxyl silane, 3-aminopropyl triethoxy silane, 3-methacryloxy-propyltrimethoxy silane, gamma-mercaptopropyl trimethoxy silane, gama-mercaptopropyl (gamma-mercaptopropyl)triethoxy silane, beta-(3,4-epoxycyclohexyl) ethyl trimethoxy silane, gamma-glycidoxypropyl trimethoxy silane, 3-vinylthiopropyl trimethoxy silane, vinyl-tris-(beta-methoxyethoxy) silane, vinyl triacetoxy silane, and mixtures thereof. A particular trialkoxysilane adhesion promoter is UCT 7840KG from United Chemical Technologies. A further adhesion promoter is KBM 803, a 3-(trimethoxysilyl)propyl thiol from Shin-Etsu Chemical Co., Ltd.

The adhesion promoter, if used, may be present in the primary coating composition in an amount of from about 0.1 to about 10% by weight, for example, from about 0.1 to about 3% by weight, and, e.g., from about 1% by weight, based upon the total weight of the composition.

Other components that may be utilized in the coating composition include antioxidants, such as IONOL available from Aldrich, which is a 2,4,6-tri-tert-butyl-4-methylphenol; flow control agents such as BYK331, a polysiloxane available from BYK-Chemie USA; sensitizers such as thioxanthone or isopropylthioxanthone (ITX) and their derivatives; stabilizers and wetting agents. Suitable amounts are known to those of ordinary skill in the art.

The foregoing coating components may be mixed or blended together using any known equipment and an optical fiber may be coated with the coating composition by any known optical fiber production technique.

The techniques may involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter. Examples of optical fiber coating techniques include the methods disclosed in U.S. Pat. Nos. 4,351,657, 4,512,281, 4,531,959, 4,539,219, 4,792,347, and 4,867,775.

After the fiber is coated with the curable coating composition, the coating composition may be cured by exposure to a sufficient curing amount of UV irradiation. For example, the coated fiber may be exposed to UV irradiation at a rate of from about 5 to 1000 mJ/cm$^2$.

As used herein, the term "primary coating" is defined as that coating which directly contacts the glass portion of the optical fiber. The uncured primary coating should be liquid at room temperature. The uncured primary coating should have a viscosity suitable for high speed processing, and the uncured primary coating should have a high cure speed. The cured primary coating should exhibit good adhesion to glass to prevent premature delamination of the coating from the glass portion of the optical fiber. The cured primary coating should have a low modulus at lower temperatures to minimize the effects of microbend attenuation due to small stresses on the optical fiber itself.

As used herein, the term "secondary coating" is defined as the coating which covers the primary coating on the optical fiber. The cured secondary coating should have sufficient modulus to give impact resistance and to provide a protective barrier, and give tensile strength to the optical fiber. The cured secondary coating should exhibit little physical change over a wide temperature range, good resistance to water and solvent absorption and have good color stability.

The uncured liquid primary or secondary coating composition should have a sufficiently low viscosity that the composition will be easily applied to form a continuous protective coating on the glass fibers. Examples of such viscosity of an order of magnitude from about $10^3$ cP at 45-50° C., e.g., from about $2\times10^3$ to about $8\times10^3$ cP at room temperature. There is no particular limitation on viscosity, however, and it can be adjusted to a given application by known methods. For example, viscosity can be adjusted depending on the type of optical fiber material being formulated and the method of application.

Generally, the thickness of the cured primary or secondary coating will be dependent on the intended use of the optical fiber, although thicknesses of about 20 to 35 microns and, in particular, thicknesses of about 25 to 30 microns are suitable.

When used as primary coatings, cured coatings in accordance with the present invention may have a glass transition temperature ($T_g$) of from about −60° C. to about 0° C., for example, from about −50° C. to about −30° C., and, e.g. about −40° C., and a low modulus of elasticity of from about 0.5 to about 3.0 MPa at room temperature (20° C.) and 50% relative humidity, for example, from about 1.0 to about 2.5 MPa.

When utilized as a secondary coating, cured coatings in accordance with the present invention may have a glass transition temperature ($T_g$) of from about 25 C to about 100° C. The cured secondary coatings may have a $T_g$ of from about 50° C. to about 80° C., for example, about 75° C. The cured secondary coatings may have a low modulus of elasticity of from about 5.0 to about 60 MPa at around 80° C. and 50% relative humidity, for example, from about 20 to about 40 MPa, and, e.g. about 30 MPa.

To provide a further detailed description of the invention, several examples are provided. Specifically, several synthesis examples for forming colored radiation curable oligomers suitable for use in a radiation curable oligomeric liquid composition for coating optical fibers and for forming optical fiber ribbon matrices are provided hereinafter. Examples of radiation curable oligomeric liquid compositions containing the colored oligomers are also provided.

EXAMPLE 1

Yellow Oligomer 202.89 g of Milliken REACTINT™ dye yellow X15 was added dropwise to a mixture of 67.44 g isophorone diisocyanate (IPDI) and dibutyltin dilaurate that had been heated to 40° C. Care was taken that the exothermic reaction did not heat above 45° C. by controlling the addition rate. The total time taken for addition was two hours. After the last addition of IPDI, 200 g of 1,6 hexanediol diacrylate (HDODA) was added as a reactive diluent to lower viscosity along with 4.4 g of inhibitor 2,6-Di-tert-butyl-4-methylphenol. This mixture was maintained at 40° C. for two hours before addition of 35.24 g 2-hydroxyethyl acrylate (HEA) dropwise with the temperature maintained below 50° C. by controlling the rate of addition of HEA. One hour after addition, there was no detectible isocyanate peak at 2270 cm$^{-1}$ as observed by FTIR. The resulting urethane acrylate oligomeric reaction product has a yellow color.

EXAMPLE 2

Blue Oligomer 152.09 g of Milliken REACTINT™ dye blue X3LV was added dropwise to a mixture of 101.13 g isophorone diisocyanate (IPDI) and 2.98 g dibutyltin dilaurate that had been heated to 40° C. Care was taken that the exothermic reaction did not heat above 45° C. by controlling the addition rate. The total time taken for addition was two hours. After the last addition of IPDI, 200 g of 1,6 hexanediol diacrylate (HDODA) was added as a reactive diluent to lower viscosity along with 2.03 g of inhibitor 2,6-di-tert-butyl-4-methylphenol. This mixture was maintained at 40° C. for two hours before addition of 52.96 g 2-hydroxyethyl acrylate (HEA) dropwise with the temperature maintained below 50° C. by controlling the rate of addition of HEA. Two hours after addition, there was no detectible isocyanate peak at 2270 cm$^{-1}$ as observed by FTIR. The resulting urethane acrylate oligomer reaction product has a blue color.

EXAMPLE 3

Black Oligomer 226.67 g of Milliken REACTINT™ dye black X95AB was added dropwise to a mixture of 93.30 g isophorone diisocyanate (IPDI) and 2.74 g dibutyltin dilaurate that had been heated to 40° C. Care was taken that the exothermic reaction did not heat above 45° C. by controlling the addition rate. The total time taken for addition was about two hours. After the last addition of IPDI, 200 g of tetrahydrafuran (THF) solvent was added as a reactive diluent to lower viscosity along with 2.38 g of inhibitor 2,6-di-tert-butyl-4-methylphenol. This mixture was maintained at 40° C. for two hours before addition of 48.78 g 2-hydroxyethyl acrylate (HEA) dropwise with the temperature maintained below 50° C. by controlling the rate of addition of HEA. Two hours after addition, there was no detectible isocyanate peak at 2270 cm$^{-1}$ as observed by FTIR. The THF solvent was then removed via rotovap vacuum technique at room temperature over a 10 h period until a weight equal to the original inputs (minus the solvent) was reached. The resulting urethane acrylate oligomer reaction product has a black color.

Several liquid coating compositions employing the colored radiation curable oligomers are described hereinafter.

EXAMPLE 4

Yellow Colored Optical Fiber Outer Coating Composition

A yellow ultraviolet radiation curable coating composition for providing a colored outer coating was made by combining 60 weight percent EBECRYL™ 4827, which is an aromatic urethane diacrylate oligomer having a molecular weight of about 1500 sold by UCB Chemicals, 30 weight percent trimethylolpropane trimethacrylate (TMPTA) sold by UCB Chemicals, which is a reactive diluent, 6 weight percent of the yellow colored urethane acrylate oligomer reaction product of the synthesis described in Example 1 and about 4 weight percent of DAROCUR™ 4268 which is a photoinitiator. The coating composition was applied on an inner coating layer and cured by exposing the composition to ultraviolet radiation in a suitable wavelength range and intensity to form a yellow colored outer protective polymeric coating.

EXAMPLE 5

Blue Colored Optical Fiber Inner Coating Composition

A blue ultraviolet radiation curable coating composition for providing a colored inner coating was made by combining 60 weight percent EBECRYL™ 230, which is a high molecular weight aliphatic urethane diacrylate oligomer (bulk oligomer) sold by UCB Chemicals, 29 weight percent beta-carboxyethyl acrylate (13-CEA) sold by UCB Chemicals, which is a monofunctional reactive diluent, 6 weight percent of the blue colored urethane acrylate oligomer reaction product of the synthesis described in Example 2 and about 5 weight percent of DAROCUR™ 4265, which is a photoinitiator. The coating composition was applied on the cladding of an optical fiber and cured by exposure to ultraviolet radiation in a suitable wavelength range and intensity to form a blue colored inner protective coating.

EXAMPLE 6

Blue Colored Optical Fiber Outer Coating Composition

A blue ultraviolet radiation curable coating composition for providing a colored outer coating was made by combining 60 weight percent EBECRYL™ 4827 (bulk oligomer), 30 weight percent TMPTA (reactive diluent), 6 weight percent of the blue colored urethane acrylate oligomer reaction product of the synthesis described in Example 2 and about 4 weight percent of DAROCUR™ 4268. The coating composition was applied to the inner coating of an optical fiber to form a blue colored outer protective polymeric coating after curing by exposure to ultraviolet radiation in a suitable wavelength range.

EXAMPLE 7

Blue Colored Ink (Tertiary) Coating Composition

A blue ultraviolet radiation curable coating composition for providing a colored tertiary coating was made by combining 25 weight percent EBECRYL™ 4866, which is an aliphatic urethane triacrylate diluted with 30 weight percent tripropylene glycol diacrylate (TRPGDA) sold by UCB Chemicals, 25 weight percent TMPTA (a reactive diluent), 35 weight percent of the blue colored urethane acrylate oligomer reaction product of the synthesis described in Example 2, 10 weight percent hexanediol diacrylate (HDODA) (a reactive diluent) and about 5 weight percent of DAROCUR™ 4268. The coating composition was applied over the outer coating of an optical fiber and cured by exposure to ultraviolet radiation in a suitable wavelength range to form a blue colored tertiary protective polymeric coating.

EXAMPLE 8

Blue Oligomer 11.16 g of isophorone diisocyanate and 0.35 g of dibutyltin dilaurate was heated to 50° C. 16.34 g of 1,5-bis ((2,2-dimethyl-3-hydroxypropyl)amino)-4,8-bis((4-methylphenyl)thio)anthraquinone was mixed with THF to get the anthracenedione into solution and added slowly to the reaction. The reaction temperature was maintained at 50° C. for three hours. The temperature was reduced to 40° C. and 0.25 g of 2,6-di-tert-butyl-4-methylphenol and 30 g of 1,6 hexanediol diacrylate was added to the reaction. 5.819 g of 2-hydroxyethyl acrylate was then added dropwise. The reaction was run to completion by measuring the isocyanate peak at 2270 cm$^{-1}$ by FTIR. The THF was evaporated off of the mixture. The resulting urethane acrylate oligomer was blue in color.

EXAMPLE 9

Blue Colored Optical Fiber Outer Coating

A blue ultraviolet radiation curable coating composition for providing a colored outer coating was made by combining 65 weight percent of EBECRYL™ 4827, which is a urethane acrylate oligomer (bulk oligomer), 30 weight percent tripropylene glycol diacrylate (TPGDA), which is a reactive diluent, 1 percent of the blue colored urethane acrylate oligomer reaction product of the synthesis described in Example 8 and about 4 percent of DAROCUR™ 4268 which is a photoinitiator. The coating composition was applied to an inner coating layer and cured by exposing the composition to ultraviolet radiation at a suitable wavelength range to form a blue colored outer protective polymeric coating.

EXAMPLE 10

Blue Colored Optical Fiber Inner Coating

A blue ultraviolet radiation curable coating composition for providing a colored inner coating was made by combining 65 weight percent of EBECRYL™ 230, which is a urethane acrylate oligomer, 29 weight percent β-CEA monofunctional reactive diluent, 1 percent of the blue colored urethane acrylate oligomer reaction product of the synthesis described in Example 8 and about 5 weight percent DAROCUR™ 4265, which is a photoinitiator. The coating composition was applied to the cladding of an optical fiber and cured by exposure to ultraviolet radiation in a suitable wavelength range to form a blue colored inner protective fiber coating.

Colored Optical Fiber Ribbon

Figure 2:
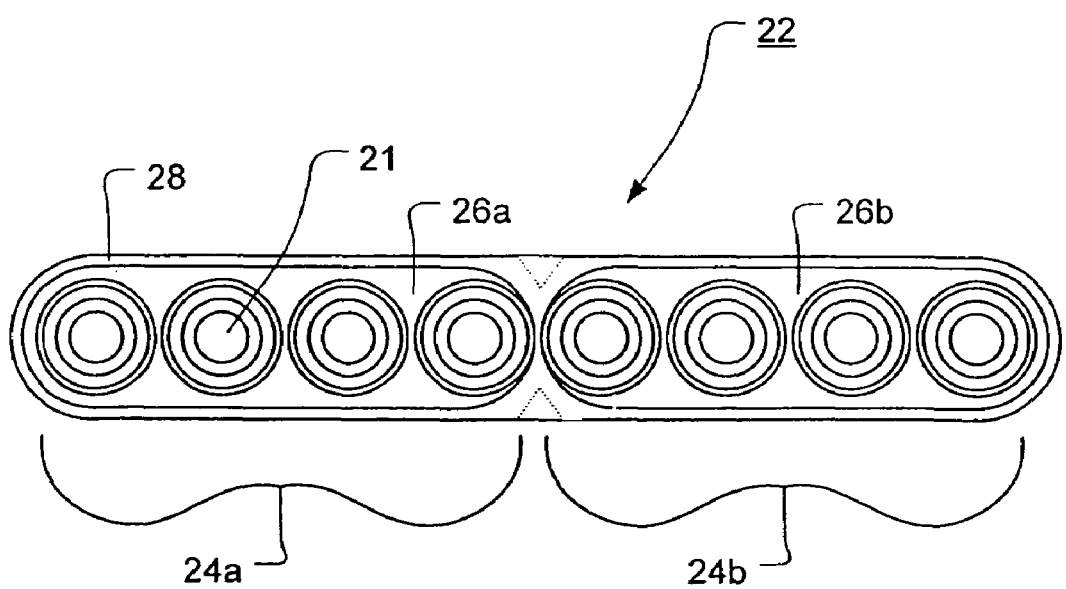
FIG. 2, which is a cross-sectional view of a splittable optical fiber ribbon containing at least one colored matrix.

Referring to FIG. 2, there is shown a typical splittable optical fiber ribbon 22 containing two planar arrays 24a, 24b of optical fibers 21. Each of the arrays of optical fibers are enveloped by a primary matrix 26a, 26b that hold the fiber arrays together. Both primary matrices 26a, 26b are enveloped by a secondary matrix 28. The primary matrices 26a, 26b, the secondary matrix 28 or both may be colored in accordance with the present invention. An example of a colored matrix is described below.

EXAMPLE 11

Blue Ribbon Matrix

A composition for forming a blue colored optical fiber ribbon matrix was made by combining 6 weight of the blue oligomer described in Example 2, 60 weight percent EBECRYL™ 4866 trifunctional oligomer (bulk oligomer), 30 weight percent TMPTA (reactive diluent) and 4 weight percent DAROCUR™ 4268 photoinitiator. The resulting composition was applied over a planar array of optical fibers using ordinary application methods with a die or an applicator. The composition was cured by exposure to ultraviolet radiation in a suitable wavelength range to form a blue colored matrix over the planar array of optical fibers.

As shown above, the present invention provides a durable color identifying coating for a telecommunication element such as an optical fiber or an optical fiber ribbon. The embodiments disclosed herein admirably achieve the objects of the present invention; however, it should be appreciated by those skilled in the art that departures can be made by those skilled in the art without departing from the spirit and scope of the invention which is limited only by the following claims.

What is claimed is:

1. A telecommunication element having a color identifying coating thereon, the telecommunication element comprising:
    an elongated communication transmission medium; and
    a coating having an identifying color applied on at least a portion of the transmission medium,
    wherein said coating comprises a radiation cured, crosslinked polymeric network,
    wherein the identifying color in the coating is provided by a colored oligomer,
    wherein said colored oligomer comprises the reaction product of:
        (a) an isocyanate end-capped oligomer; and
        (b) a radiation-curable monomer having both (i) a reactive functionality which is reactive with isocyanate and (ii) ethylenic unsaturation,
    wherein said colored oligomer is end-capped with radiation-curable groups by covalent linkages formed by reacting said reactive functionality (i) of said radiation-curable monomer (b) with an isocyanate moiety of said isocyanate end-capped oligomer (a),
    wherein said isocyanate end-capped oligomer (a) is the reaction product of:
        (c) at least one polyfuctional compound having at least two isocyanate reactive groups; and
        (d) at least one polyisocyanate,
    wherein said polyfuctional compound (c) comprises at least one dye having at least two isocyanate reactive functionalities,
    wherein said at least one dye is an anthraquinone dye, and
    wherein said anthraquinone dye has the formula

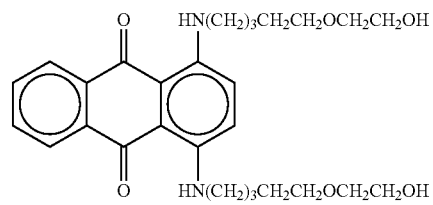

or said anthraquinone dye is selected from the group consisting of 1,5-bis((3-hydroxy-2,2-dimethylpropyl)amino)-9,10-anthracenedione; 2,2'-((9,10-dihydro-9,10-dioxo-1,5-anthracenediyl)bis(thio))bis-benzoic acid, 2-hydroxyethyl ester; and 1,5-bis((2,2-dimenthyl-3-hydroxypropyl)amino)-4,8-bis((4-methylphenyl)thio) anthraquinone.

2. The telecommunications element of claim 1, wherein:
    (i) the elongated transmission medium is an optical fiber having a core and a cladding surrounding the core; and
    (ii) the identifying color is thermally stable and light fast.

3. The telecommunications element of claim 1, wherein said anthraquinone dye is 1,5-bis((2,2-dimethyl-3-hydroxypropyl)amino)-4,8-bis((4-methylphenyl)thio-) anthraquinone.

4. The telecommunications element of claim 1, wherein a (meth)acrylic group represents the ethylenic unsaturation (ii) in the radiation curable monomer (b).

* * * * *